US012738062B2

(12) United States Patent
Kang et al.

(10) Patent No.: US 12,738,062 B2
(45) Date of Patent: Sep. 15, 2026

(54) FINE DUST MONITORING METHOD AND DEVICE AND SYSTEM USING THE SAME FOR MONITORING WORKPLACE AIR CONDITION

(71) Applicant: DEEPVISIONS CO., LTD., Seoul (KR)

(72) Inventors: Bong Su Kang, Seoul (KR); Jun Sang Cho, Seoul (KR); Won Hee Jo, Seoul (KR); Nalinh Thoummala, Seoul (KR); Sung Jae Lee, Seoul (KR); Hong Kyu Lee, Seoul (KR)

(73) Assignee: DEEPVISIONS CO., LTD., Seoul (KR)

( * ) Notice: Subject to any disclaimer, the term of this patent is extended or adjusted under 35 U.S.C. 154(b) by 335 days.

(21) Appl. No.: 18/396,040

(22) Filed: Dec. 26, 2023

(65) Prior Publication Data

US 2025/0209820 A1 Jun. 26, 2025

(30) Foreign Application Priority Data

Dec. 20, 2023 (KR) ........................ 10-2023-0187348

(51) Int. Cl.
*G06V 20/52* (2022.01)
*G06V 10/25* (2022.01)
*G06V 20/40* (2022.01)

(52) U.S. Cl.
CPC .............. *G06V 20/52* (2022.01); *G06V 10/25* (2022.01); *G06V 20/40* (2022.01)

(58) Field of Classification Search
CPC ........ G06V 20/52; G06V 10/25; G06V 10/82; G06N 3/08; G08B 21/182; G01N 2015/0096
See application file for complete search history.

(56) References Cited

U.S. PATENT DOCUMENTS

2020/0042861 A1* 2/2020 Park .................. G01N 33/0062
2021/0063036 A1* 3/2021 Oh ...................... G06V 10/764
2023/0087048 A1* 3/2023 Cho ........................ F24F 11/46
700/276
2024/0169485 A1* 5/2024 Lee ....................... H04N 23/90

FOREIGN PATENT DOCUMENTS

CN 114511991 A * 5/2022 ............. G08B 21/12
KR 10-2020-0057987 A 5/2020
KR 20230067463 A * 5/2023 ........... G06N 3/0464
KR 102653942 B1 * 4/2024 .............. F24F 11/56
KR 20250019456 A * 2/2025 ............. A61B 5/746

* cited by examiner

*Primary Examiner* — Andrew M Moyer
*Assistant Examiner* — Conor A O'Malley
(74) *Attorney, Agent, or Firm* — The PL Law Group, PLLC

(57) ABSTRACT

In a fine dust monitoring method, it is checked whether or not a preset first measurement event occurs in an area covered by the monitoring device, an occurrence point of the first measurement event is photographed when the first measurement event occurs, and a fine dust concentration of a point where the first measurement event occurred by inputting a photographed video image according to the first measurement event is outputted to a pre-trained first deep learning model.

9 Claims, 9 Drawing Sheets

FIRST CONVERTED IMAGE (HS CHANNELS)

FIRST CONVERTED IMAGE (S CHANNEL)

SECOND CONVERTED IMAGE

SECOND CONVERTED IMAGE(TRANSMITTANCE)

STILL IMAGE (ORIGINAL)

THIRD CONVERTED IMAGE

FOURTH CONVERTED IMAGE

FIFTH CONVERTED IMAGE

SIXTH CONVERTED IMAGE

FINE DUST MONITORING METHOD AND DEVICE AND SYSTEM USING THE SAME FOR MONITORING WORKPLACE AIR CONDITION

CROSS-REFERENCE TO RELATED APPLICATION AND CLAIM OF PRIORITY

This application claims the benefit under 35 USC § 119 of Korean Patent Application No. 10-2023-0187348, filed on Dec. 20, 2023, in the Korean Intellectual Property Office, the entire disclosure of which is incorporated herein by reference for all purposes.

BACKGROUND

1. Field

Embodiments of the present disclosure are related to a fine dust monitoring technology.

2. Description of Related Art

Fine dust is dust whose particles are so small that they are invisible to the eye. There are studies illustrating that fine dust incapacitates a defense system of the body and has various effects on the body, such as cardiovascular, respiratory, and cerebrovascular diseases, and the International Agency for Research on Cancer (IARC) under the World Health Organization (WHO) announced that fine dust was designated as a group 1 carcinogen. Due to these risks, fine dust is being analyzed as the cause of the problem of declining economic activity among members of society.

In particular, fugitive dust of construction sites generates high concentrations of fine dust of once due to its nature, and has the characteristics that fugitive dust is rapidly reduced after the completion of the work. Therefore, when workers move around close to the time point when fugitive dust occurs, they are exposed to situations that adversely affect their health.

SUMMARY

Embodiments of the present disclosure are intended to provide a fine dust monitoring method and device that can monitor fine dust generated in a site, measure concentration of the fine dust, and provide a notification service, and a system using the same.

According to an exemplary embodiment of the present disclosure, there is provided a fine dust monitoring method performed in a monitoring device installed at a place for which a fine dust monitoring service is provided, the method including checking whether or not a preset first measurement event occurs in an area covered by the monitoring device, photographing an occurrence point of the first measurement event when the first measurement event occurs, and outputting a fine dust concentration of a point where the first measurement event occurred by inputting a photographed video image according to the first measurement event to a pre-trained first deep learning model.

The first measurement event may include one or more of detection of a moving means equal to or greater than a preset speed, detection of noise generation equal to or greater than a preset sound, and detection of a work operation of preset equipment.

In the outputting of the fine dust concentration, the first deep learning model may be caused to extract a target region from the photographed video image and output a fine dust concentration of the extracted target region.

In the outputting of the fine dust concentration, the first deep learning model may be caused to create a bounding box around the target region while tracking the target region according to changes in a location and size of the target region in the photographed video image, and create the bounding box around each target region when a plurality of target regions are extracted from the photographed video image.

The fine dust monitoring method may further include generating a notification signal based on the target region of the photographed video image and the fine dust concentration of the target region, and transmitting the notification signal to a user terminal.

In the generating of the notification signal, different types of notification signals may be generated depending on a range of the target region and a magnitude of a fine dust concentration value of the target region.

The transmitting of the notification signal to the user terminal may include determining a user terminal to which the notification signal is to be transmitted based on a site location corresponding to the target region and a location of the user terminal, and transmitting the notification signal to the determined user terminal.

In the generating of the notification signal, when the range of the target region is less than a preset reference range and the fine dust concentration value of the target region is less than a preset reference value, a first passive notification signal may be generated, when the range of the target region is less than the preset reference range and the fine dust concentration value of the target region is equal to or greater than the preset reference value, a first active notification signal may be generated, when the range of the target region is equal to or greater than the preset reference range and the fine dust concentration value of the target region is less than the preset reference value, a second passive notification signal may be generated, and when the range of the target region is equal to or greater than the preset reference range and the fine dust concentration value of the target region is equal to or greater than the preset reference value, a second active notification signal may be generated.

The first passive notification signal or the first active notification signal may be transmitted to a user terminal located within a first preset distance based on the site location corresponding to the target region, and the second passive notification signal or the second active notification signal may be transmitted to a user terminal located within a second distance that is set farther than the first distance based on a site location corresponding to the target region.

The fine dust monitoring method may further include checking whether or not a preset second measurement event occurs, photographing the front of the monitoring device or a preset place when the second measurement event occurs, and measuring the fine concentration dust of a photographing target point based on a photographed video image according to the second measurement event.

The measuring of the fine dust concentration may further include extracting a still image from the photographed video image, generating a converted image by converting the extracted still image into an image with characteristics sensitive to fine dust, and outputting the fine dust concentration of the photographing target point by inputting the converted image into a pre-trained second deep learning model.

The measuring of the fine dust concentration may further include acquiring one or more of environmental information and climate information during the photographing, and determining what type of image to convert the still image into based on one or more of the environmental information and climate information.

The fine dust monitoring method may further include calculating changes in fine dust concentration values by weather, season, or month based on one or more of the fine dust concentration measured according to the first measurement event and the fine dust concentration measured according to the second measurement event, or tallying one or more of the number of times, time, and frequency of occurrence of fine dust equal to or greater than a preset threshold value based on one or more of the fine dust concentration measured according to the first measurement event and the fine dust concentration measured according to the second measurement event.

According to another exemplary embodiment of the present disclosure, there is provided a device installed at a place for which a fine dust monitoring service is provided, the device including an event detection module that checks whether or not a preset first measurement event occurs in an area covered by the device, a photographing module that photographs an occurrence point of the first measurement event when the first measurement event occurs, and a first fine dust measurement module that outputs a fine dust concentration of a point where the first measurement event occurred by inputting a photographed video image according to the first measurement event to a pre-trained first deep learning model.

According to still another exemplary embodiment of the present disclosure, there is provided a fine dust monitoring system including a monitoring device that is installed at a place for which a fine dust monitoring service is provided, photographs a corresponding point according to an occurrence of a preset first measurement event, extracts a target region of a photographed video image according to the first measurement event by inputting the photographed video image into a pre-trained first deep learning model, outputs a fine dust concentration of the target region, and generates a notification signal based on the target region and the fine dust concentration of the target region, and one or more user terminals that receive the notification signal from the monitoring device.

DETAILED DESCRIPTION

Hereinafter, a specific embodiment of the present disclosure will be described with reference to the drawings. The following detailed description is provided to aid in a comprehensive understanding of the methods, apparatus and/or systems described herein. However, this is illustrative only, and the present disclosure is not limited thereto.

In describing the embodiments of the present disclosure, when it is determined that a detailed description of related known technologies may unnecessarily obscure the subject matter of the present disclosure, a detailed description thereof will be omitted. In addition, terms to be described later are terms defined in consideration of functions in the present disclosure, which may vary according to the intention or custom of users or operators. Therefore, the definition should be made based on the contents throughout this specification. The terms used in the detailed description are only for describing embodiments of the present disclosure, and should not be limiting. Unless explicitly used otherwise, expressions in the singular form include the meaning of the plural form. In this description, expressions such as "comprising" or "including" are intended to refer to certain features, numbers, steps, actions, elements, some or combination thereof, and it is not to be construed to exclude the presence or possibility of one or more other features, numbers, steps, actions, elements, some or combinations thereof, other than those described.

In addition, terms such as first, second, etc. may be used to describe various components, but the components should not be limited by the terms. Terms may be used for the purpose of distinguishing one component from another. For example, a first component may be referred to as a second component, and similarly, the second component may also be referred to as a first component without departing from the scope of the present disclosure.

Figure 1:
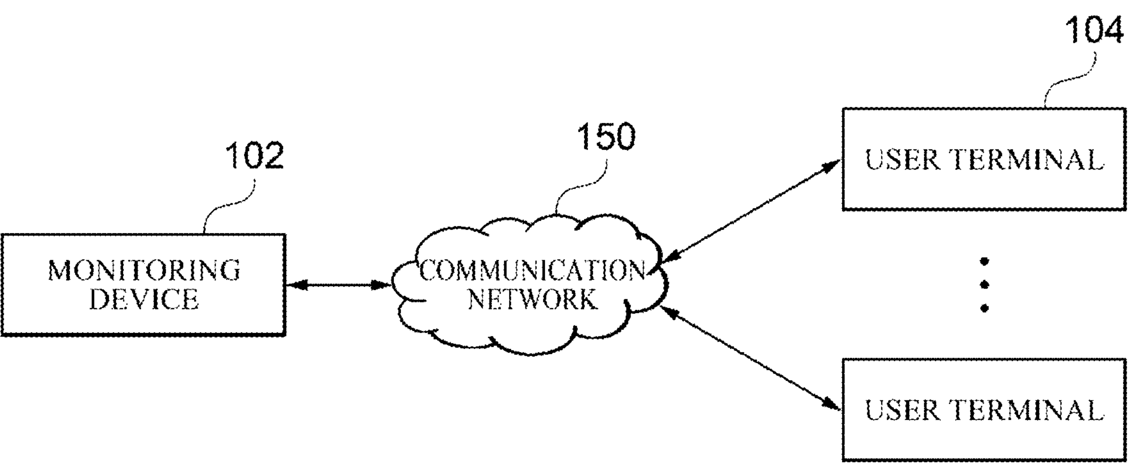
FIG. 1 is a diagram illustrating a configuration of a fine dust monitoring system according to an embodiment of the present disclosure.

FIG. 1 is a diagram illustrating the configuration of a fine dust monitoring system according to an embodiment of the present disclosure.

Referring to FIG. 1, the fine dust monitoring system 100 may include a monitoring device 102 and a user terminal 104. The monitoring device 102 and the user terminal 104 are communicatively connected to the monitoring server 104 through a communication network 150.

Here, the communication network 150 may include the Internet, one or more local area networks, wide area networks, cellular networks, mobile networks, other types of networks, or a combination of these networks.

In one embodiment, the fine dust monitoring system 100 may be prepared to be installed at a construction site and to measure fine dust and generate a notification to workers or nearby residents according to the measurement result. However, the present disclosure is not limited thereto, and of course, the fine dust monitoring system 100 can be applied to various fields, such as fire monitoring fields.

One or more monitoring devices 102 may be installed at a place (for example, a construction site, etc.) for which a fine dust monitoring service is provided. For example, a plurality of monitoring devices 102 may be installed spaced apart to cover different regions depending on an area of the place for providing the fine dust monitoring service. The monitoring device 102 may measure fine dust generated in the region covered by the monitoring device 102, generate a notification signal, and transmit the notification signal to the user terminal 104.

The user terminal 104 may be a user terminal receiving the fine dust monitoring service. The user terminal 104 may transmit location information of the user terminal 104 to the monitoring device 102. The user terminal 104 may receive a notification signal related to fine dust from the monitoring device 102. Here, the user may be a worker or manager at the construction site, but is not limited thereto, and may include residents near the construction site.

In one embodiment, an application for receiving the fine dust monitoring service may be installed on the user terminal 104. The application may be stored in a computer-readable storage medium of the user terminal 104. The application includes a predetermined set of instructions executable by a processor of the user terminal 104.

Figure 2:
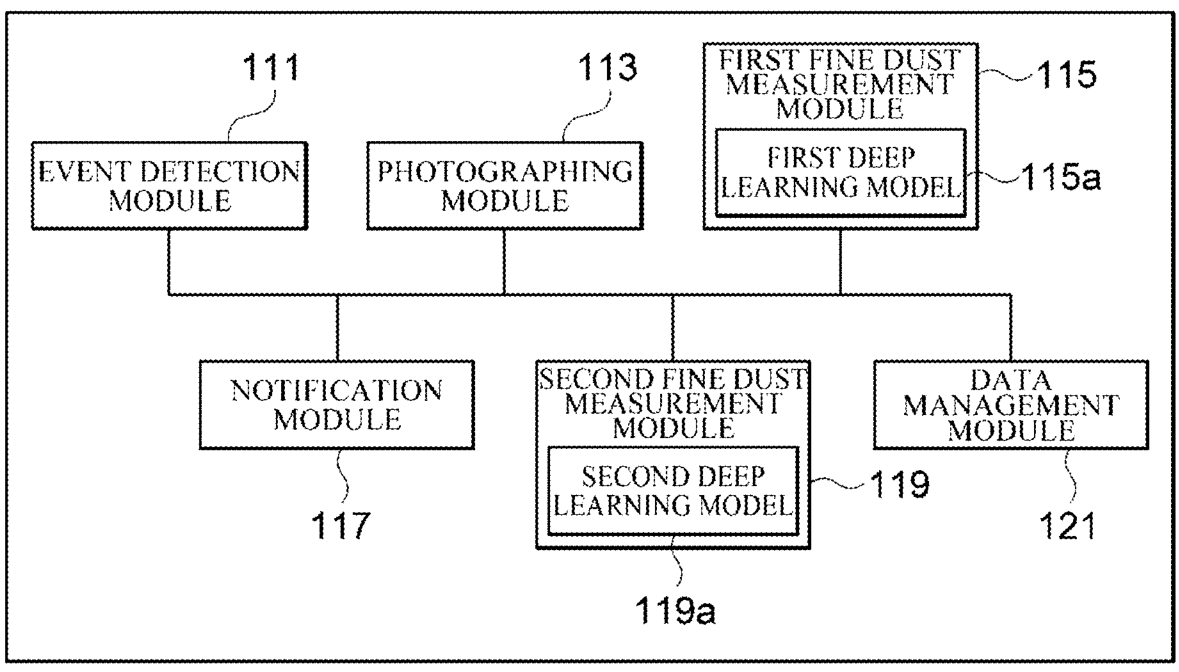
FIG. 2 is a block diagram illustrating a configuration of a monitoring device according to an embodiment of the present disclosure.

FIG. 2 is a block diagram illustrating a configuration of the monitoring device 102 according to an embodiment of the present disclosure. Referring to FIG. 2, the monitoring device 102 includes an event detection module 111, a photographing module 113, a first fine dust measurement module 115, a notification module 117, and a second fine dust measurement module 119, and a data management module 121.

The event detection module 111 may detect whether or not a preset first measurement event occurs in the area covered by the monitoring device 102. Here, the preset first measurement event is an event with a high probability of occurrence of fine dust depending on a work situation in a site, and may include, for example, detection of a moving means (e.g., vehicles, trucks, etc.) equal to or greater than a preset speed, detection of noise generation equal to or greater than a preset sound, and detection of work operation of preset equipment, etc., but is not limited thereto.

The photographing module 113 may be prepared to photograph an occurrence point of the first measurement event when the preset first measurement event occurs. In one embodiment, the photographing module 113 may include a camera of which rotation and tilt can be controlled. The photographing module 113 may adjust one or more of the rotation and tilt of the camera so as to photograph a point where the first measurement event occurs. If the occurrence of the first measurement event is caused by the moving object (e.g., trucks or excavators, etc.), the photographing module 113 may photograph the object while tracking the object.

In addition, the photographing module 113 may photograph the area covered by the monitoring device 102 according to a preset second measurement event. The second measurement event is an event for measuring the fine dust concentration in normal times, and may occur according to a preset cycle or instruction. In one embodiment, the photographing module 113 may photograph the front of the photographing module 113 when the second measurement event occurs, but is not limited thereto, and may photograph a preset place.

The first fine dust measurement module 115 may measure the fine dust concentration of a photographing target point based on a video image (i.e., photographed video image) photographed by the photographing module 113 according to the first measurement event. The first fine dust measurement module 115 may measure the fine dust concentration of a photographing target point from the photographed video image based on deep learning. Accordingly, the first fine dust measurement module 115 may include a first deep learning model 115*a*. The first fine dust measurement module 115 may train the first deep learning model 115*a* to predict the fine dust concentration of the photographing target point from the photographed video image according to the first measurement event.

Specifically, the first fine dust measurement module 115 may train the first deep learning model 115*a* to extract a target region from the photographed video image. Here, the target region may be a region in which fine dust is generated according to the occurrence of the first measurement event in the photographed video image.

The first fine dust measurement module 115 may input the photographed video image as training data to the first deep learning model 115*a*, and train the first deep learning model 115*a* so that a difference between target region predicted by the first deep learning model 115*a* and an actual target region (i.e., correct answer value) is minimized by comparing the target region with the actual target region.

The first fine dust measurement module 115 may train the first deep learning model 115*a* to create a bounding box around the target region in the photographed video image. The first fine dust measurement module 115 may train the first deep learning model 115*a* to create the bounding box around the target region while tracking the target region depending on changes in the location and size of the target region, etc. in the photographed video image. When a plurality of target regions are extracted from the photographed video image, the first fine dust measurement module 115 may create a bounding box around each target region.

In addition, the first fine dust measurement module 115 may train the first deep learning model 115*a* to predict the fine dust concentration for the target region of the photographed video image. The first fine dust measurement module 115 may train, by comparing the predicted fine dust concentration value for the target region of the first deep learning model 115*a* with the actually measured fine dust concentration value (i.e., the correct answer value), the first deep learning model 115*a* so that the difference between the predicted fine dust concentration value and the actually measured fine dust concentration value is minimized.

When receiving the photographed video image according to the first measurement event from the photographing module 113 in a state where the training of the first deep learning model 115*a* is completed, the first fine dust measurement module 115 may input the photographed video image into the first deep learning model 115*a* to extract the target region, and output the fine dust concentration value of the extracted target region.

Figure 3:
FIG. 3 is a diagram illustrating a state in which a first deep learning model extracts one target region from a photographed video image and outputs a fine dust concentration value of the extracted target region in an embodiment of the present disclosure.
Figure 4:
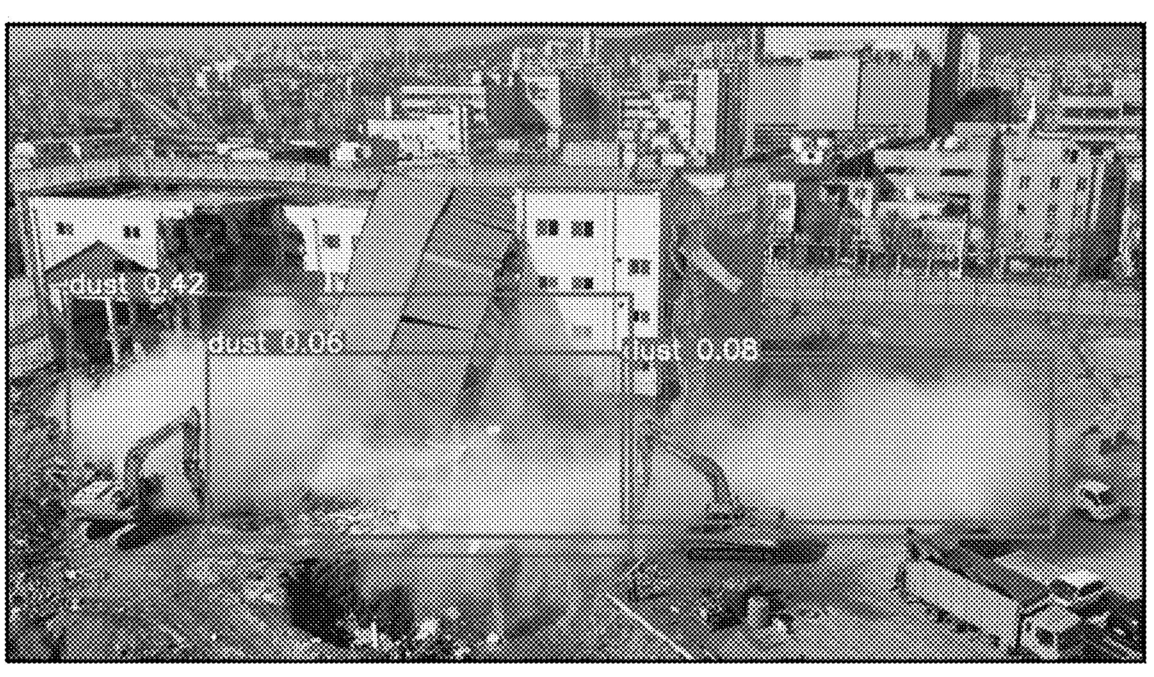
FIG. 4 is a diagram illustrating a state in which the first deep learning model extracts a plurality of target regions from the photographed video image and outputs the fine dust concentration value of each extracted target region in an embodiment of the present disclosure.
Figure 5:
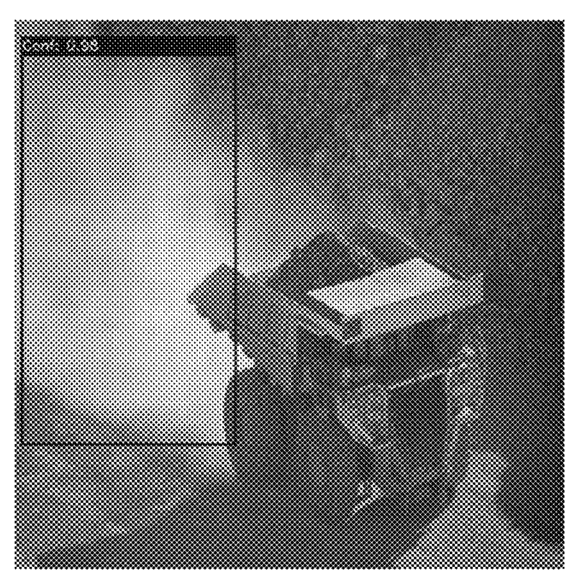
FIG. 5 is a diagram illustrating various embodiments of extracting target regions and outputting fine dust concentration values from the photographed video image according to an embodiment of the present disclosure.
Figure 5:
Figure 5:
Figure 5:

FIG. 3 is a diagram illustrating a state in which the first deep learning model 115*a* extracts one target region from the photographed video image and outputs the fine dust concentration value of the extracted target region in an embodiment of the present disclosure. FIG. 4 is a diagram illustrating a state in which the first deep learning model 115*a* extracts a plurality of target regions from the photographed video image and outputs the fine dust concentration value of each extracted target region in an embodiment of the present disclosure. Here, a situation where a building is being demolished using an excavator at a construction site is shown as an example. FIG. 5 is a diagram illustrating various embodiments of extracting the target regions and outputting fine dust concentration values from the photographed video images according to an embodiment of the present disclosure.

The notification module 117 may receive the target region of the photographed video image according to the first measurement event and the fine dust concentration value of the target region from the first fine dust measurement module 115. In addition, the notification module 117 may receive location information of each user terminal 104. The notification module 117 may generate a notification signal based on the target region of the photographed video image according to the first measurement event and the fine dust concentration value of the target region.

The notification module 117 may generate different types of notification signals depending on the range of the target region and the magnitude of the fine dust concentration value of the target region. The notification module 117 may select the user terminal 104 to which the notification signal is to be transmitted based on the site location corresponding to the target region and the location of the user terminal 104.

Specifically, the notification module 117 may generate a first passive notification signal when the range of the target region is less than a preset reference range and the fine dust concentration value of the target region is less than a preset reference value. The notification module 117 may transmit the first passive notification signal to the user terminal 104 located within a first preset distance based on the site location corresponding to the target region. The first passive notification signal may be a notification signal that prevents users located within the first distance from accessing the corresponding target region.

The notification module 117 may generate a first active notification signal when the range of the target region is less than the preset reference range and the fine dust concentration value of the target region is equal to or greater than the preset reference value. The notification module 117 may transmit the first active notification signal to the user terminal 104 located within the first preset distance based on the site location corresponding to the target region. The first active notification signal may be a notification signal that induces users located within the first distance to move away from the vicinity of the corresponding target region.

The notification module 117 may generate a second passive notification signal when the range of the target region is equal to or greater than the preset reference range and the fine dust concentration value of the target region is less than the preset reference value. The notification module 117 may transmit the second passive notification signal to the user terminal 104 located within a second distance which is set to be farther than the first distance based on the site location corresponding to the target region. The second passive notification signal may be a notification signal that prevents users located within the second distance from accessing the corresponding target region.

The notification module 117 may generate a second active notification signal when the range of the target region is equal to or greater than the preset reference range and the fine dust concentration value of the target region is equal to or greater than the preset reference value. The notification module 117 may transmit the second active notification signal to the user terminal 104 located within the preset second distance based on the site location corresponding to the target region. The second active notification signal may be a notification signal that induces users located within the second distance to move away from the vicinity of the corresponding target region.

The second fine dust measurement module 119 may measure the fine dust concentration of the photographing target point based on the video image photographed (i.e., photographed video image) by the photographing module 113 according to the second measurement event. In order to measure the fine dust concentration based on deep learning, the second fine dust measurement module 119 may include a second deep learning model 119*a*.

Specifically, the second fine dust measurement module 119 may extract still images from the photographed video image for the second measurement event. That is, the photographed video image for the second measurement event consists of continuous images, and thus a plurality of still images may be extracted from the photographed video image. Here, the still image may be a red, green, blue (RGB) image.

The second fine dust measurement module 119 may convert the extracted still image into an image with different characteristics. The second fine dust measurement module 119 may convert the extracted still image into one or more images with characteristics sensitive to fine dust. That is, the second fine dust measurement module 119 may convert the extracted still image into one or more images suitable for measuring the fine dust concentration.

In one embodiment, the second fine dust measurement module 119 may generate a first converted image by converting the still image (i.e., RGB image) into a hue, saturation, value (HSV) image. Here, because the HSV image has pure color information in hue (H), colors can be classified more easily in HSV image than in RGB image, and are less affected by changes in illuminance or shade by adjusting the value (V) value.

When the still image is converted to the HSV image, the second fine dust measurement module 119 may use the HSV image itself as the first conversion image, uses hue (H) and saturation(S) channels in the HSV image as the first conversion image, or use only the saturation(S) channel in the HSV image as the first conversion image. In this case, the hue (H) or saturation(S) value varies depending on the fine dust concentration.

In addition, the second fine dust measurement module 119 may generate a second converted image by performing image conversion on the still image by applying the dark channel prior (DCP) technique to the still image. When the dark channel prior (DCP) technique is applied to the still image, haze (a phenomenon in which the object appears hazy due to the propagation of light being interrupted by substances present between the object and the camera) present in the still image can be removed. In this case, the second fine dust measurement module 119 may extract the transmittance characteristics of the still image based on the dark channel prior (DCP) technique and use this as the second converted image. The turbidity of the second converted image varies depending on the fine dust concentration.

In addition, the second fine dust measurement module 119 may generate a third conversion image by performing image conversion on the still image by applying a Gabor Filter to the still image. When the Gabor filter is applied to the still image, an edge can be extracted from still image, and the clarity of the edge varies depending on the amount of fine dust.

In addition, the second fine dust measurement module 119 may generate a fourth conversion image by performing image conversion on the still image by applying a Sobel Filter to the still image. The Sobel filter is a filter that performs filtering according to the direction of frequency in an image, and can detect a diagonal edge more sensitively than the horizontal and vertical edges.

In addition, the second fine dust measurement module 119 may generate a fifth conversion image by performing image conversion on the still image by applying the local binary pattern (LBP) technique to the still image. The local binary pattern (LBP) technique extracts features of an image by converting pixel values around each pixel of the image into binary numbers (0 or 1). The binary numbers are generated according to a relative brightness difference between the center pixel and neighboring pixels. That is, if the neighboring pixel is larger than the center pixel, it is treated as a binary number, 1, and if it is smaller than the center pixel, it is treated as a binary number of 0.

In addition, the second fine dust measurement module 119 may generate the sixth converted image by performing image conversion on the still image by applying Laplacian Filter to the still image. The Laplacian filter performs second differentiation in the horizontal and vertical directions of the image, and through this, it is possible to find the center of the edge portion (i.e., the inflection point of pixel value change).

Figure 6:
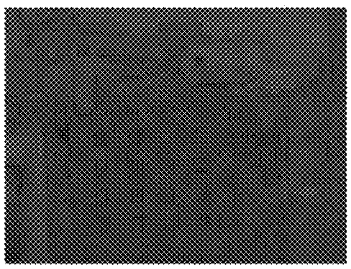
FIG. 6 is a diagram illustrating first to sixth converted images generated by performing a first type of conversion on a still image in an embodiment of the present disclosure.
Figure 6:
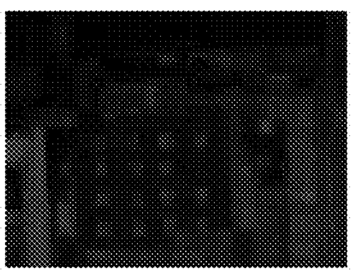
Figure 6:
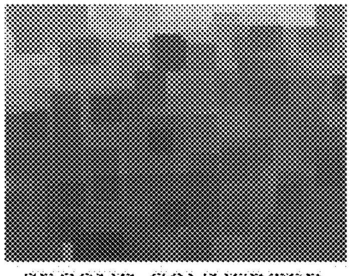
Figure 6:
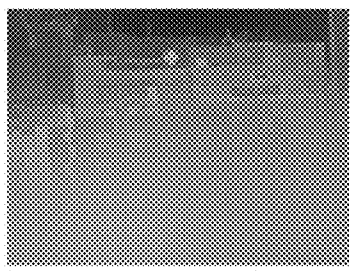
Figure 6:
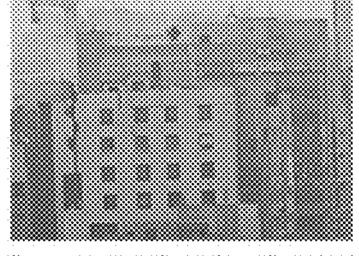
Figure 6:
Figure 6:
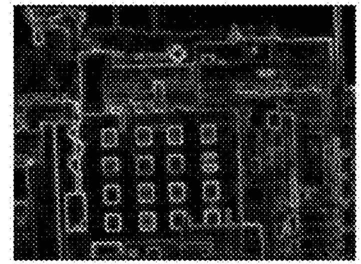
Figure 6:
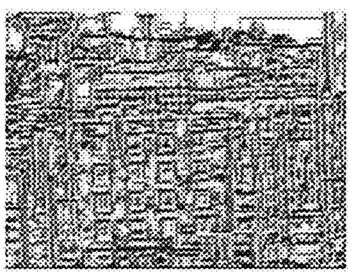
Figure 6:
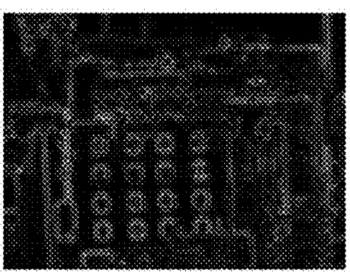

FIG. 6 is a diagram illustrating first to sixth converted images generated by performing the first type of conversion on the still image in an embodiment of the present disclosure. The second fine dust measurement module 119 may generate first to sixth conversion images, respectively, based on the still image in a training phase of the second deep learning model 119*a*.

Meanwhile, the second fine dust measurement module 119 may determine which type of image conversion to perform when performing the image conversion on the still image based on additional information input at an inference phase for measuring the fine dust concentration according to the second measurement event after training of the second deep learning model 119*a* is completed, which will be described later. Here, the additional information may be environmental information or climate information of the place for measuring the fine dust concentration. In one embodiment, the additional information may include, but is not limited to, the temperature, humidity, illuminance, and wind speed of the place for measuring the fine dust concentration.

The second fine dust measurement module 119 may train the second deep learning model 119*a* to predict the fine dust concentration of the photographing target point by inputting one or more converted images into the second deep learning model 119*a*. The second deep learning model 119*a* may be trained so that the difference between the predicted fine dust concentration and the actually measured fine dust concentration (i.e., correct answer value) is minimized.

Here, the correct answer value may be acquired from a device that actually measures the fine dust concentration (e.g., light scattering sensor, etc.) at the photographing target point. The fine dust concentration measurement device may actually measure the fine dust concentration of the corresponding place according to the photographing time period. However, the present disclosure is not limited thereto, and, as the correct answer, fine dust concentration data for the region including the site may be received from an external organization.

The second fine dust measurement module 119 may input the first to sixth converted images into the second deep learning model 119*a*, respectively. The first to sixth converted images are not input simultaneously but may be input sequentially for each training epoch.

The second deep learning model 119*a* may receive the first converted image as input and output a first fine dust concentration prediction value. The second deep learning model 119*a* may receive the second converted image as input and output a second fine dust concentration prediction value. Likewise, the second deep learning model 119*a* may receive third to sixth converted images as input and output third to sixth fine dust concentration prediction values, respectively. The second deep learning model 119*a* may be trained so that the difference between each of the first to sixth fine dust concentration prediction values and the correct answer value (actually measured fine dust concentration value) is minimized by comparing each of the first to sixth fine dust concentration prediction values with the correct answer value.

During the training process, the second fine dust measurement module 119 may extract the prediction value closest to the correct answer value among the first to sixth fine dust concentration prediction values, and store the type of converted image corresponding to the extracted prediction value by matching the type of converted image with one or more of environmental information (e.g., illuminance of the target place, etc.) and climate information (e.g., temperature, humidity, and wind speed of the target place, etc.) during photographing of the corresponding still image.

For example, when the sixth fine dust concentration prediction value is closest to the correct answer value, the second fine dust measurement module 119 may store the type of converted image corresponding to the sixth fine dust concentration prediction value by matching the type of converted image with environmental information and climate information during photographing of the image. Through this, it is possible to establish a criterion for converting the photographed image from environmental and climate information into what type of image (i.e., which image among the first to the sixth conversion images).

The second fine dust measurement module 119, during training of the second deep learning model 119*a*, may convert still images of photographed in various places and time periods to generate converted images, and train the second deep learning model 119*a* using the generated converted images as training data.

Meanwhile, here, it has been described as an example that there is only one second deep learning model 119*a*, but is not limited thereto, and a deep learning model may be prepared for each converted image. For example, a corresponding deep learning model may be provided for each converted image, such as a 2-1 deep learning model that outputs the first fine dust concentration prediction value using the first converted image as input and, a 2-2 deep learning model that outputs the second fine dust concentration prediction value using the second converted image as input, etc.

The data management module 121 may manage the fine dust concentration values measured by the first fine dust measurement module 115 and the second fine dust measurement module 119. In one embodiment, the data management module 121 may tally the number of times, time, and frequency of occurrence of fine dust equal to or greater the preset threshold based on the fine dust concentration values measured by one or more of the first fine dust measurement module 115 and the second fine dust measurement module 119 during a preset period.

The data management module 121 may calculate changes in fine dust concentration values by weather, season, month, etc. based on fine dust concentration values measured by one or more of the first fine dust measurement module 115 and the second fine dust measurement module 119 measured during the preset period. For example, when the monitoring device 102 is installed at a construction site, the data management module 119 may calculate the change in fine dust concentration value for each construction period of the construction site.

Meanwhile, the monitoring device 102 may further include a display (not illustrated) that displays fine dust concentration values measured by one or more of the first fine dust measurement module 115 and the second fine dust measurement module 119.

According to embodiments of the present disclosure, when fugitive dust occurs at the construction site or building site, etc., by quickly detecting the occurrence of fugitive dust, measuring the fugitive dust concentration, and generating a notification signal to nearby users, it is possible to prevent users in the site from being exposed to danger due to the occurrence of fugitive dust.

In this specification, a module may mean a functional and structural combination of hardware for carrying out the technical idea of the present disclosure and software for driving the hardware. For example, the "module" may mean a logical unit of a predetermined code and hardware resources for executing the predetermined code, and does not necessarily mean a physically connected code or one type of hardware.

Figure 7:
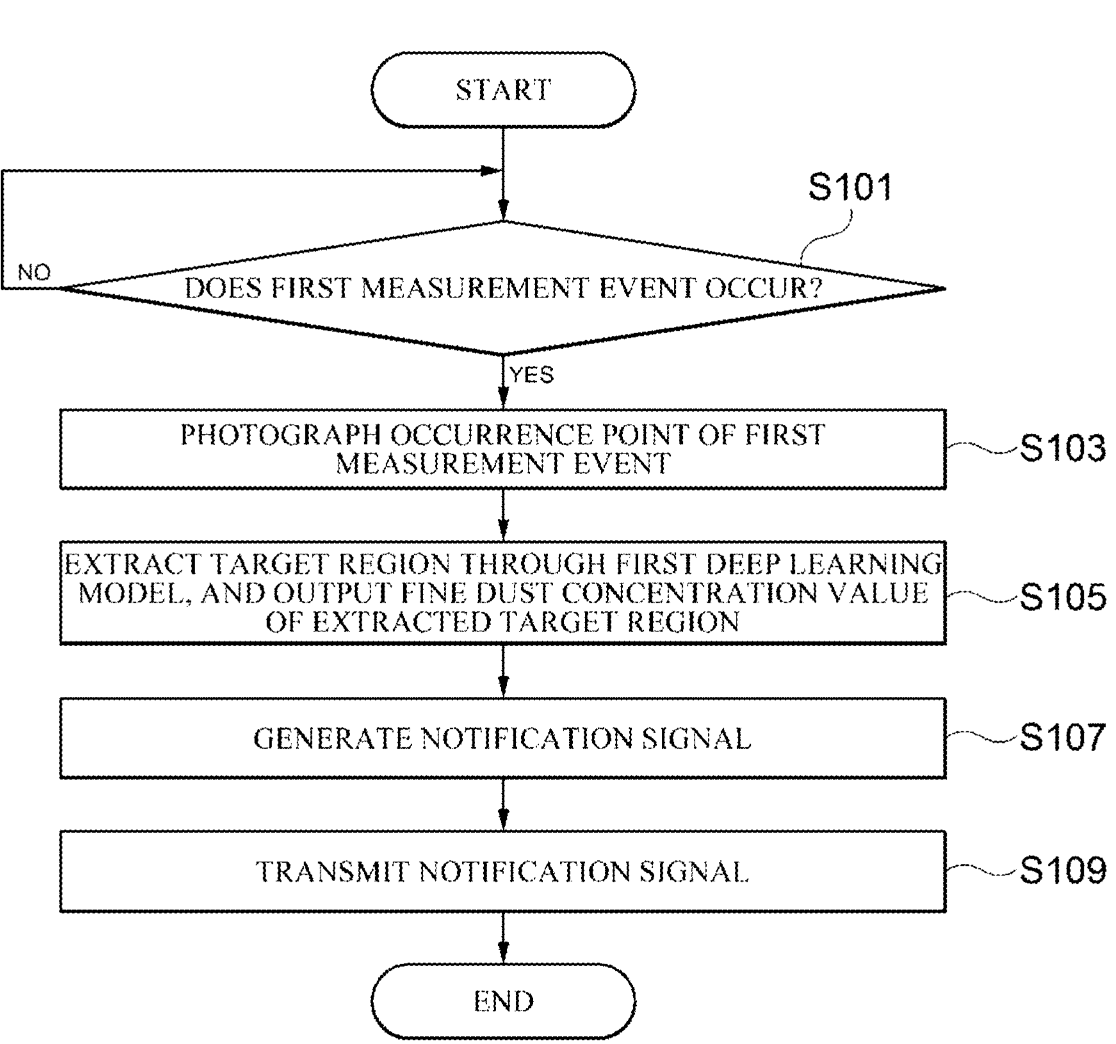
FIG. 7 is a flowchart illustrating a fine dust monitoring method according to an embodiment of the present disclosure.

FIG. 7 is a flowchart for describing the fine dust monitoring method according to an embodiment of the present disclosure. In the illustrated flowchart, the method is described by being divided into a plurality of steps, but at least some of the steps may be performed in a different order, may be performed together in combination with other steps, omitted, may be performed by being divided into detailed steps, or may be performed by being added with one or more steps (not illustrated).

Referring to FIG. 7, the monitoring device 102 may check whether or not the preset first measurement event occurs in the area covered by the monitoring device 102 (S 101). As a result of the check in S 101, when the preset first measurement event occurs, the monitoring device 102 may photograph the occurrence point of the first measurement event (S 103). In this case, if the occurrence of the first measurement event is caused by the moving object (e.g. trucks or excavators, etc.), the monitoring device 102 may track and photograph the object.

Next, the monitoring device 102 may input the photographed video image according to the first measurement event into the pre-trained first deep learning model 115*a*, extract a target region from the photographed video image, and output the fine dust concentration value of the extracted target region (S 105).

Next, the monitoring device 102 may generate the notification signal based on the target region of the photographed video image and the fine dust concentration value of the target region (S 107). For example, the monitoring device 102 may generate one notification signal of the first passive notification signal, the first active notification signal, the second passive notification signal, and the second active notification signal depending on the target region of the photographed video image and the fine dust concentration value of the target region.

Next, the monitoring device 102 may determine the user terminal 104 to which the notification signal is to be transmitted based on the site location corresponding to the target region and the location of the user terminal 104, and transmit the notification signal to the determined user terminal 104 (S 109).

Figure 8:
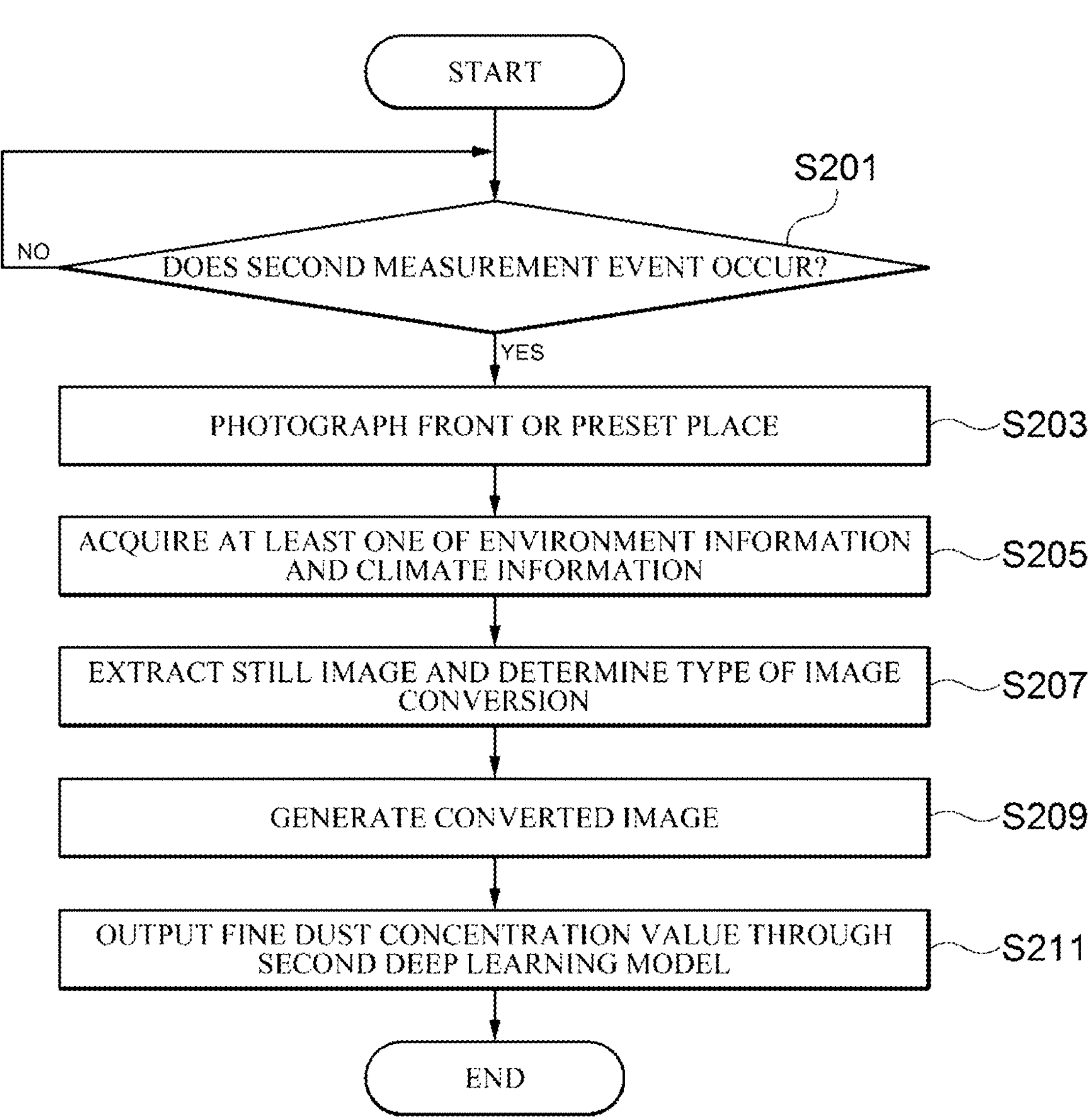
FIG. 8 is a flowchart illustrating a fine dust monitoring method according to another embodiment of the present disclosure.

FIG. 8 is a flowchart illustrating a fine dust monitoring method according to another embodiment of the present disclosure. In the illustrated flowchart, the method is described by being divided into a plurality of steps, but at least some of the steps may be performed in a different order, may be performed together in combination with other steps, omitted, may be performed by being divided into detailed steps, or may be performed by being added with one or more steps (not illustrated).

Referring to FIG. 8, the monitoring device 102 may check whether or not the preset second measurement event occurs (S 201). As a result of the check in S 201, if the second measurement event occurs, the monitoring device 102 may photograph the front thereof or a preset location (S 203).

Next, the monitoring device 102 may acquire one or more of environmental information and climate information when filming (S 205). Next, the monitoring device 102 may extract the still image from the photographed video image, and determine what type of image to convert the still image into based on one or more of environmental information and climate information (S 207).

Next, the monitoring device 102 may generate a converted image by converting the still image into a predetermined type of image (S 209). Next, the monitoring device 102 may input the converted image into the pre-trained second deep learning model 119*a* and output the fine dust concentration value of a photographing target place (S 211).

Figure 9:
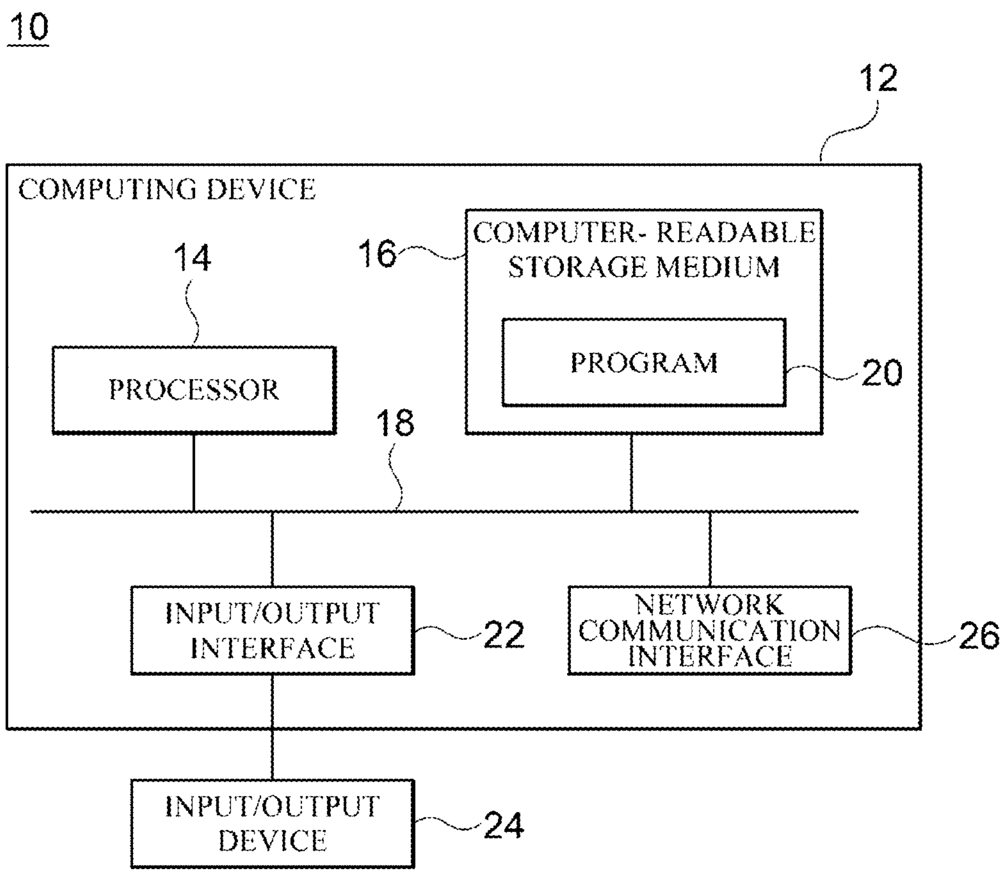
FIG. 9 is a block diagram for illustratively describing a computing environment including computing devices suitable for use in example embodiments.

FIG. 9 is a block diagram for illustratively describing a computing environment 10 including a computing device suitable for use in exemplary embodiments. In the illustrated embodiment, respective components may have different functions and capabilities other than those described below, and may include additional components in addition to those described below.

The illustrated computing environment 10 includes a computing device 12. In one embodiment, the computing device 12 may be the monitoring device 102. In addition, the computing device 12 may be the user terminal 104.

The computing device 12 includes at least one processor 14, a computer-readable storage medium 16, and a communication bus 18. The processor 14 may cause the computing device 12 to operate according to the exemplary embodiment described above. For example, the processor 14 may execute one or more programs stored on the computer-readable storage medium 16. The one or more programs may include one or more computer-executable instructions, which, when executed by the processor 14, may be configured so that the computing device 12 performs operations according to the exemplary embodiment.

The computer-readable storage medium 16 is configured so that the computer-executable instruction or program code, program data, and/or other suitable forms of information are stored. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and capable of storing desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a speech or sound input device, input devices such as various types of sensor devices and/or photographing devices, and/or output devices such as a display device, a printer, a speaker, and/or a network card. The exemplary input/output device 24 may be included inside the computing device 12 as a component configuring the computing device 12, or may be connected to the computing device 12 as a separate device distinct from the computing device 12.

According to embodiments of the present disclosure, when fugitive dust occurs at a construction site or building site, etc., by quickly detecting the occurrence of fugitive dust, measuring the fugitive dust concentration, and generating a notification signal to nearby users, it is possible to prevent users in the site from being exposed to danger due to the occurrence of fugitive dust.

Although representative embodiments of the present disclosure have been described in detail, a person skilled in the art to which the present disclosure pertains will understand that various modifications may be made thereto within the limits that do not depart from the scope of the present disclosure. Therefore, the scope of rights of the present disclosure should not be limited to the described embodiments, but should be defined not only by claims set forth below but also by equivalents to the claims.

What is claimed is:

1. A fine dust monitoring method performed in a monitoring device installed at a place for which a fine dust monitoring service is provided, the method comprising:

checking whether or not a preset first measurement event occurs in an area covered by the monitoring device;

photographing an occurrence point of the first measurement event when the first measurement event occurs;

outputting a fine dust concentration of a point where the first measurement event occurred by inputting a captured video image according to the first measurement event to a pre-trained first deep learning model;

generating a notification signal based on the target region of the captured video image and the fine dust concentration of the target region; and transmitting the notification signal to a user terminal, wherein, in the outputting of the fine dust concentration, the first deep learning model is caused to extract a target region from the captured video image and output a fine dust concentration of the extracted target region, wherein, in the generating of the notification signal, when the range of the target region is less than a preset reference range and the fine dust concentration value of the target region is less than a preset reference value, a first passive notification signal is generated, when the range of the target region is less than the preset reference range and the fine dust concentration value of the target region is equal to or greater than the preset reference value, a first active notification signal is generated, when the range of the target region is equal to or greater than the preset reference range and the fine dust concentration value of the target region is less than the preset reference value, a second passive notification signal is generated, and when the range of the target region is equal to or greater than the preset reference range and the fine dust concentration value of the target region is equal to or greater than the preset reference value, a second active notification signal is generated.

2. The fine dust monitoring method of claim 1, wherein the first measurement event includes one or more of detection of a moving means equal to or greater than a preset speed, detection of a noise level equal to or greater than a preset sound level, and detection of an active operation of preset equipment for performing a designated task.

3. The fine dust monitoring method of claim 1, wherein, in the outputting of the fine dust concentration, the first deep learning model is caused to create a bounding box around the target region while tracking the target region according to changes in a location and size of the target region in the captured video image, and create the bounding box around each target region when a plurality of target regions are extracted from the captured video image.

4. The fine dust monitoring method of claim 1, wherein the transmitting of the notification signal to the user terminal includes:

determining a user terminal to which the notification signal is to be transmitted based on a site location corresponding to the target region and a location of the user terminal; and transmitting the notification signal to the determined user terminal.

5. The fine dust monitoring method of claim 1, wherein the first passive notification signal or the first active notification signal is transmitted to a user terminal located within a first preset distance based on the site location corresponding to the target region, and the second passive notification signal or the second active notification signal is transmitted to a user terminal located within a second distance that is set farther than the first distance based on a site location corresponding to the target region.

6. The fine dust monitoring method of claim 1, further comprising:

checking whether or not a preset second measurement event occurs;

photographing the front of the monitoring device or a preset place when the second measurement event occurs; and measuring the fine concentration dust of a photographing target point based on a captured video image according to the second measurement event.

7. The fine dust monitoring method of claim 6, wherein the measuring of the fine dust concentration further includes:

extracting a still image from the captured video image;

generating a converted image by converting the extracted still image into an image with characteristics sensitive to fine dust; and outputting the fine dust concentration of the photographing target point by inputting the converted image into a pre-trained second deep learning model.

8. The fine dust monitoring method of claim 7, wherein the measuring of the fine dust concentration further includes:

acquiring one or more of environmental information and climate information during the photographing; and determining what type of image to convert the still image into based on one or more of the environmental information and climate information.

9. The fine dust monitoring method of claim 6, further comprising:

calculating changes in fine dust concentration values by weather, season, or month based on one or more of the fine dust concentration measured according to the first measurement event and the fine dust concentration measured according to the second measurement event, or tallying one or more of the number of times, time, and frequency of occurrence of fine dust equal to or greater than a preset threshold value based on one or more of the fine dust concentration measured according to the first measurement event and the fine dust concentration measured according to the second measurement event.

* * * * *